US012218460B2

(12) United States Patent
Kuo

(10) Patent No.: US 12,218,460 B2
(45) Date of Patent: Feb. 4, 2025

(54) RUGGED PLUG AND UNPLUGGING METHOD THEREOF

(71) Applicant: GETAC TECHNOLOGY CORPORATION, New Taipei (TW)

(72) Inventor: Hsiu-Yu Kuo, Taipei (TW)

(73) Assignee: Getac Technology Corporation, New Taipei (TW)

( * ) Notice: Subject to any disclaimer, the term of this patent is extended or adjusted under 35 U.S.C. 154(b) by 219 days.

(21) Appl. No.: 18/098,051

(22) Filed: Jan. 17, 2023

(65) Prior Publication Data

US 2024/0022022 A1 Jan. 18, 2024

Related U.S. Application Data

(60) Provisional application No. 63/388,980, filed on Jul. 13, 2022.

(51) Int. Cl.

| | |
|---|---|
| ***H01R 13/633*** | (2006.01) |
| ***H01R 13/627*** | (2006.01) |
| ***H01R 24/60*** | (2011.01) |

(52) U.S. Cl.

CPC ....... *H01R 13/633* (2013.01); *H01R 13/6273* (2013.01); *H01R 24/60* (2013.01)

(58) Field of Classification Search

CPC ... H01R 13/633; H01R 13/6273; H01R 24/60

See application file for complete search history.

(56) References Cited

U.S. PATENT DOCUMENTS

| | | | | |
|---|---|---|---|---|
| 5,171,161 A * | 12/1992 | Kachlic | H01R 12/716 | 439/352 |
| 5,435,744 A * | 7/1995 | Derstine | H01R 13/6275 | 439/352 |
| 5,634,809 A * | 6/1997 | Hirai | H01R 13/6275 | 439/352 |
| 9,197,015 B2 * | 11/2015 | Tanaka | H01R 13/639 | |
| 10,168,488 B1 | 1/2019 | Fabian | | |
| 11,658,439 B2 * | 5/2023 | Kuo | H01R 13/639 | 439/358 |
| 2012/0027359 A1 | 2/2012 | Katoh | | |
| 2017/0179644 A1 * | 6/2017 | Tanaka | H01R 13/633 | |

FOREIGN PATENT DOCUMENTS

| | | |
|---|---|---|
| CN | 102637980 A | 8/2012 |
| CN | 102187530 B | 6/2014 |
| WO | 2020164662 A1 | 8/2020 |

* cited by examiner

*Primary Examiner* — Oscar C Jimenez

(74) *Attorney, Agent, or Firm* — Cooper Legal Group, LLC

(57) ABSTRACT

This disclosure is directed to a rugged plug having a connector, an elastic inner sheath and a slidable rigid sheath. The connector has a coupling end. The elastic inner sheath sleeves the connector. The elastic inner sheath has an elastic arm, and a hook is protruded from one lateral side of the elastic arm. The hook protrudes from the side of the elastic inner sheath and a tip of the hook is a curved surface, an actuating slope is defined on the elastic arm, and a direction normal to the actuating slope is biased toward the coupling end of the connector. The slidable rigid sheath movably sleeves the elastic inner sheath, the slidable rigid sheath cover the actuating slope and the hook is located outside the slidable rigid sheath, the slidable rigid sheath has an actuating structure and the actuating structure abuts against the actuating slope.

13 Claims, 8 Drawing Sheets

10

RUGGED PLUG AND UNPLUGGING METHOD THEREOF

The application claims priority to U.S. Provisional Application No. 63/388,980, filed on Jul. 13, 2022, the disclosure of which is hereby incorporated by reference herein in its entirety.

BACKGROUND OF THE INVENTION

Field of the Invention

The disclosure relates to a rugged plug, and more particularly, to a rugged plug that can be easily unplugged and an unplugging method thereof.

Description of the Prior Art

A rugged plug is a connector device having a rugged structure. When a connector of the rugged plug is in a connected state, the rugged structure is capable of withstanding external forces to prevent the connector from falling off or from being damaged. However, a common rugged plug is locked by a structure such as a latch or a hook and hence prevented from falling. Thus, more complicated actions are also needed to release and unplug the rugged plug. As a result, it is usually not easy to plug and unplug a common rugged plug.

In view of the above, on the basis of extensive development with the practice of theories, the applicant has provided an invention in aim of improving and resolving the above issues above.

SUMMARY OF THE INVENTION

The disclosure is directed to a rugged plug that can be easily unplugged and an unplugging method thereof.

The disclosure is directed to a rugged plug having a connector, an elastic inner sheath and a slidable rigid sheath. The connector has a coupling end. The elastic inner sheath sleeves the connector. The elastic inner sheath has an elastic arm, and a hook is protruded from one lateral side of the elastic arm. The hook protrudes from the side of the elastic inner sheath, a tip of the hook is a curved surface, an actuating slope is defined on the elastic arm, and a direction normal to the actuating slope is biased toward the coupling end of the connector. The slidable rigid sheath movably sleeves the elastic inner sheath and covers the actuating slope, and the hook is located outside the slidable rigid sheath. The slidable rigid sheath has an actuating structure, and the actuating structure abuts against the actuating slope.

In one embodiment of the disclosure, the elastic inner sheath and the slidable rigid sheath are made of different stainless steel materials.

In one embodiment of the disclosure, the connector is in a USB type-C plug specification or the connector is in a USB type-C receptacle specification. The connector has a coupling end and a wiring end opposite to the coupling end, and a wire extends from the wiring end of the connector. One end of the elastic inner sheath has a port and the port packs against the wire. The wiring end of the connector is enveloped by a reinforcement sheath, and the wire passes through the reinforcement sheath and envelops the port of the elastic inner sheath. A yielding recess corresponding to the elastic arm is provided on an outer wall of the wire, and the elastic arm is capable of being biased and receded in the yielding recess.

In one embodiment of the disclosure, the connector has a coupling end and a wiring end opposite to the coupling end. The elastic arm extends from the wiring end of the connector toward the coupling end of the connector.

The disclosure is further directed to an unplugging method for a rugged plug. The unplugging method includes: providing a socket and a rugged plug plugged in the socket, wherein the rugged plug has an elastic inner sheath and a slidable rigid sheath, the slidable rigid sheath movably sleeves the elastic inner sheath, the elastic inner sheath has an elastic arm, a hook is protruded laterally from the elastic arm, the hook protrudes from a side of the elastic inner sheath, a tip of the hook is a curved surface, the hook is fastened at the socket, an actuating slope is defined on the elastic arm, a direction normal to the actuating slope is biased toward the socket, and an actuating structure sleeves the slidable rigid sheath and abuts against the actuating slope; moving the slidable rigid sheath in a direction away from the socket, such that the actuating structure pushes the actuating slope and biases the elastic arm, and the hook recedes toward into the elastic inner sleeve and loosens the socket; continually moving the slidable rigid sleeve in the direction away from the socket to push and move the rugged plug, such that the tip of the hook slides off from the socket; and continually moving the slidable rigid sheath in the direction away from the socket to recede the rugged plug away from the socket.

In one embodiment of the disclosure, the socket includes a rigid housing, and the hook is fastened at the rigid housing. When the rugged plug is plugged in the socket, the elastic inner sheath is plugged in the rigid housing, and the hook is inserted in the rigid housing. The rigid housing and the slidable rigid sheath are made of different stainless steel materials.

In one embodiment of the disclosure, the elastic inner sheath and the slidable rigid sheath are made of different stainless steel materials.

In one embodiment of the disclosure, the rugged plug includes a connector inserted in the elastic inner sheath, and the socket includes a mating connector inserted in the rigid housing. When the rugged plug is plugged in the socket, the connector is connected to the mating connector. The connector is in a USB type-C plug specification, and the mating connector is in a USB type-C receptacle specification; or the connector is in a USB type-C receptacle specification, and the mating connector is in a USB type-C plug specification.

DETAILED DESCRIPTION OF THE EMBODIMENTS

Figure 1:
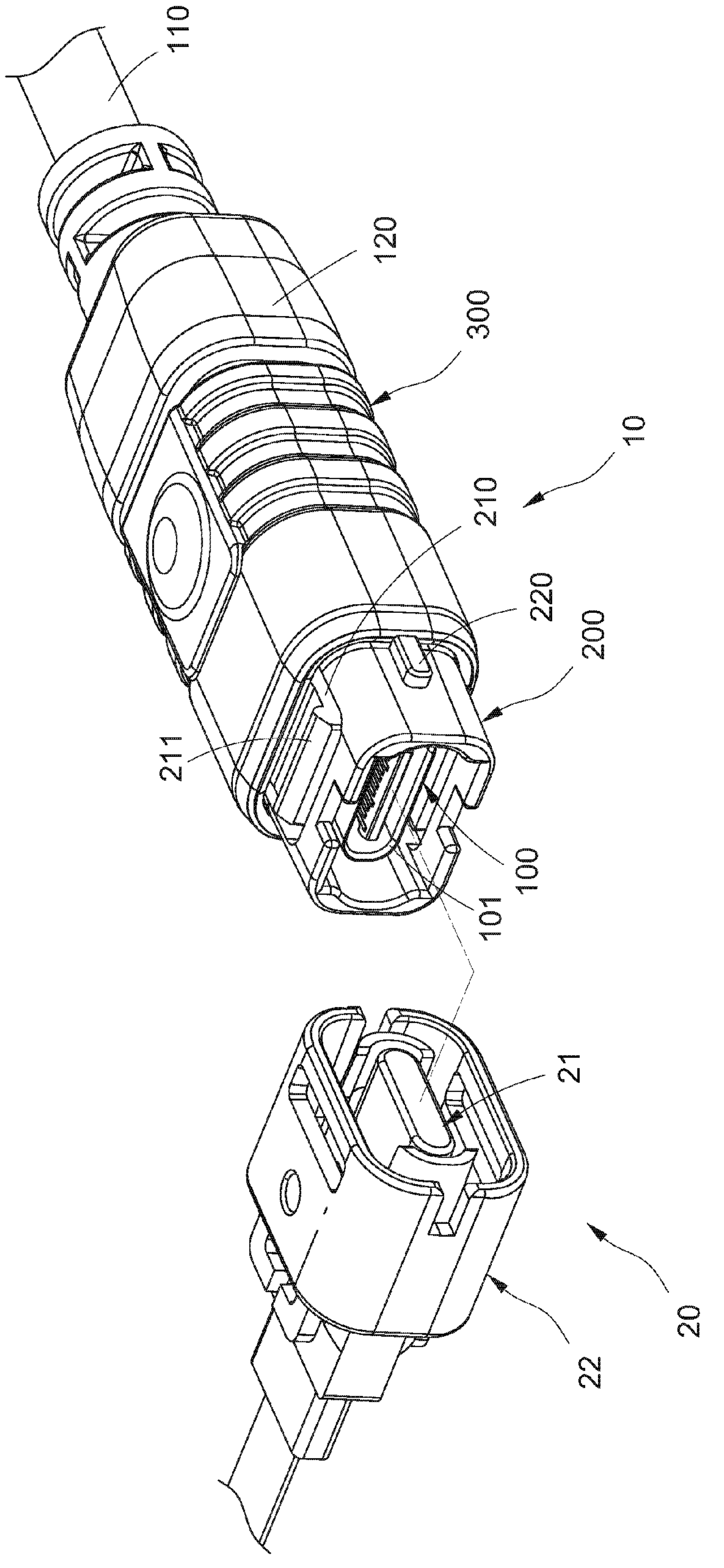
FIG. 1 is a perspective schematic diagram of a rugged plug plugged in a socket according to an embodiment of the disclosure.
Figure 2:
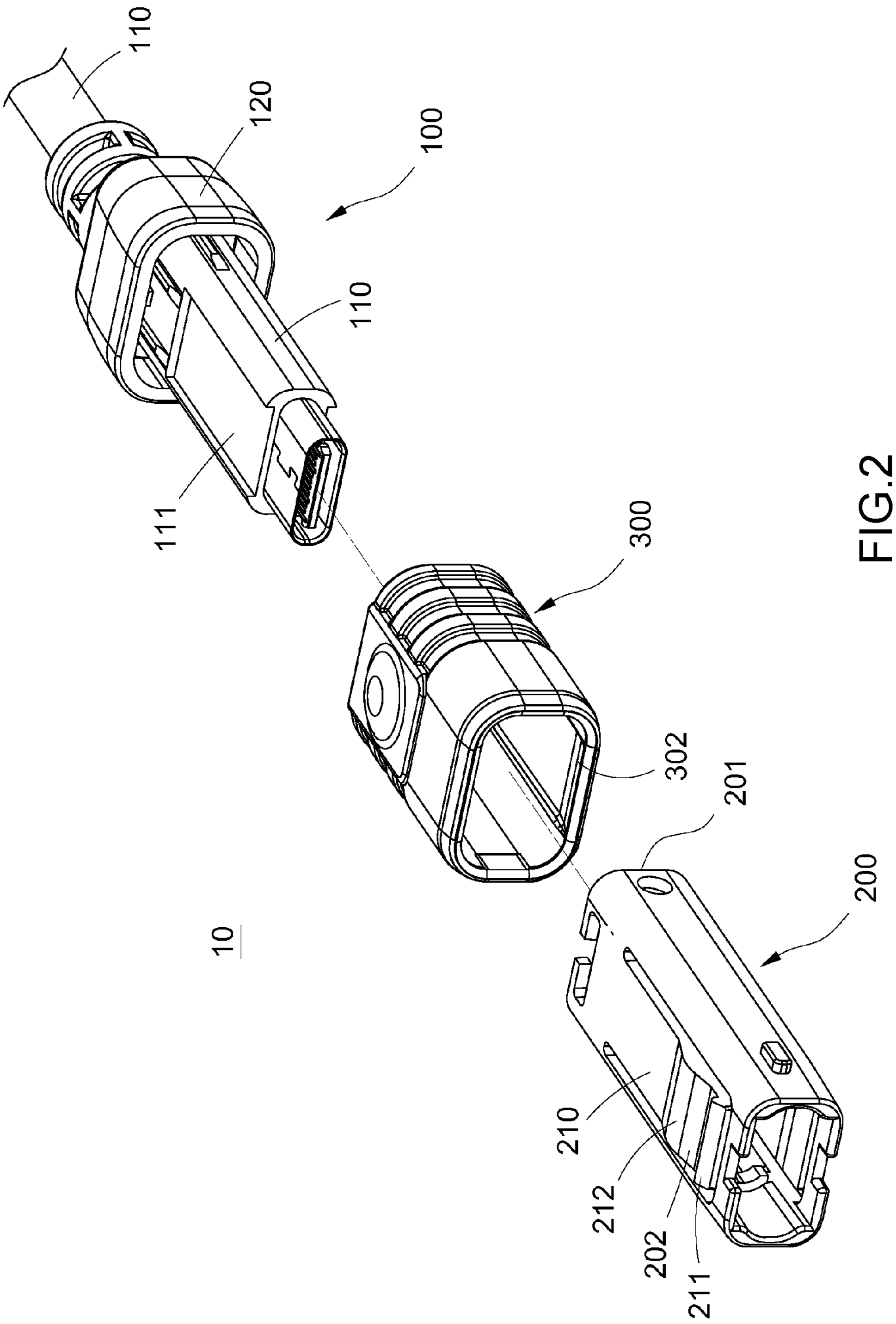
FIG. 2 is an exploded perspective schematic diagram of a rugged plug according to an embodiment of the disclosure.
Figure 3:
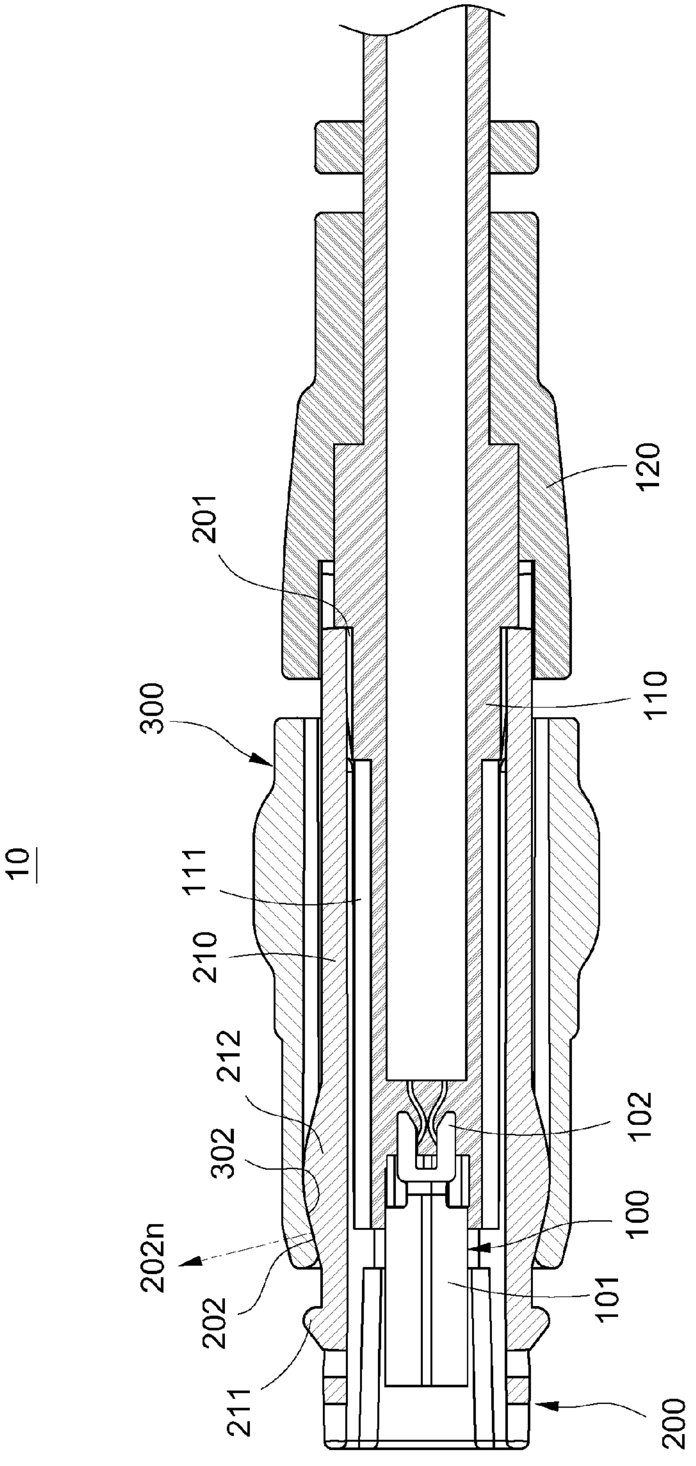
FIG. 3 a longitudinal section diagram of a rugged plug according to an embodiment of the disclosure.

Referring to FIG. 1 to FIG. 3, a rugged plug 10 is provided according to an embodiment of the disclosure. The rugged plug 10 includes a connector 100, an elastic inner sheath 200 and a slidable rigid sheath 300.

Figure 7:
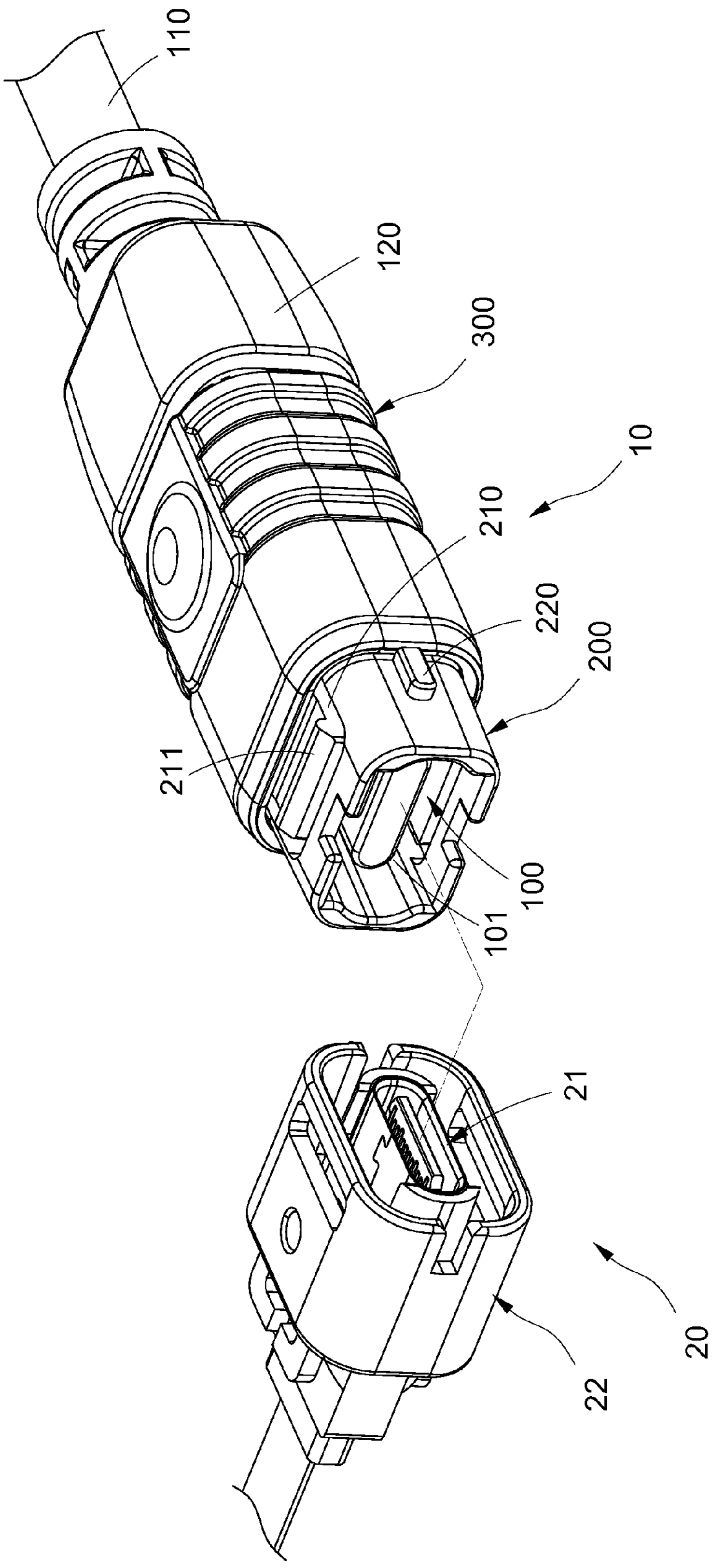
FIG. 7 is a perspective schematic diagram of a rugged plug plugged in a socket according to another embodiment of the disclosure.

In this embodiment, the connector 100 may be in a USB type-C receptacle specification as shown in FIG. 1, or the connector 100 may be in a USB type-C plug specification as shown in FIG. 7. The connector 100 has a coupling end 101 and a wiring end 102 opposite to the coupling end 102, and a wire 110 extends from the wiring end 102 of the connector 100. The wiring end 102 of the connector 100 is enveloped by a reinforcement sheath 120, and the wire 110 passes through the reinforcement sheath 120. The reinforcement sheath 120 is capable of reinforcing the structural strength of the wire 110 to prevent bending and hence breaking of the wire 110.

The slidable rigid sheath 300 and the elastic inner sheath 220 are made of different stainless steel materials, such that the slidable rigid sheath 300 has a rigidity higher than that of the elastic inner sheath 200, and the elastic inner sheath 200 is elastic at the slidable rigid sheath 300. In this embodiment, the elastic inner sheath 200 is, for example, a cylinder made of 17-4PH stainless steel and has two open ends. The elastic inner sheath 200 sleeves the connector 100. One end of the inner sheath is disposed corresponding to the wiring end 102 of the connector 100 and a port 201 is provided on that end. The port 201 packs against the wire 110, and the reinforcement sheath 120 envelops the port 201 of the elastic inner sheath 200. An elastic arm 210 is provided on at least one side of the elastic inner sheath 200. However, the disclosure does not specifically define the number of the elastic arm 210; for example, in this embodiment, a pair of elastic arms 210 are disposed correspondingly on two opposite sides of the elastic inner sheath 200. In this embodiment, each elastic arms 210 extends from the wiring end 102 of the connector 100 toward the coupling end 101 of the connector 101, such that an end of each elastic arm 210 is disposed correspondingly to the coupling end 101 of the connector 21. However, the disclosure is not limited to the example above, and each elastic arm 210 may also be disposed in a configuration reverse to the above. A hook 211 is protruded from one lateral side of each elastic arm 210. Each hook 211 protrudes from an outer wall of the elastic inner sheath 200, and a tip of each hook 211 is a curved surface. When each elastic arm 210 receives a force and is biased toward into elastic inner sheath 200, the hook 211 can thus recede toward into the elastic inner sheath 200. An actuating slope 202 is defined on each elastic arm 210, and a direction **202*n* normal to each actuating slope 202 is biased toward the coupling end 101 of the connector 100. In this embodiment, a boss 212 is protruded from the side of the hook 211 of the each elastic arm 210, and the actuating slope 202 is formed on the boss 212. A yielding recess 111 corresponding to each elastic arm 210 is provided on an outer wall of the wire 110, and each elastic arm 210 is capable of being biased and receded in each corresponding yielding recess 111 when biased toward into the elastic inner sheath 200** by a force received.

The slidable rigid sheath 300 is, for example, a cylinder made of 316 stainless steel and having two open ends, and may movably sleeve the elastic inner sheath 200. At least one stop block 220 is protruded from the outer wall of the elastic inner sheath 200, and the stop block 220 and the reinforcement sheath 120 respectively correspond to two ends of a stroke of the slidable rigid sheath 300 so as to prevent the slidable rigid sheath 300 from falling off. The slidable rigid sheath 300 covers the actuating slope 202, and the hook 211 is located outside the slidable rigid sheath 211. The slidable rigid sheath 300 has an actuating structure 302, and the actuating structure 302 abuts against the actuating slope 202. In this embodiment, the actuating structure 302 may be a surface abutting against the actuating slope 202; however, the disclosure is not limited to the above example. For example, the actuating structure 302 may also be in a form of a protrusion abutting against the actuating slope 202.

Figure 8:
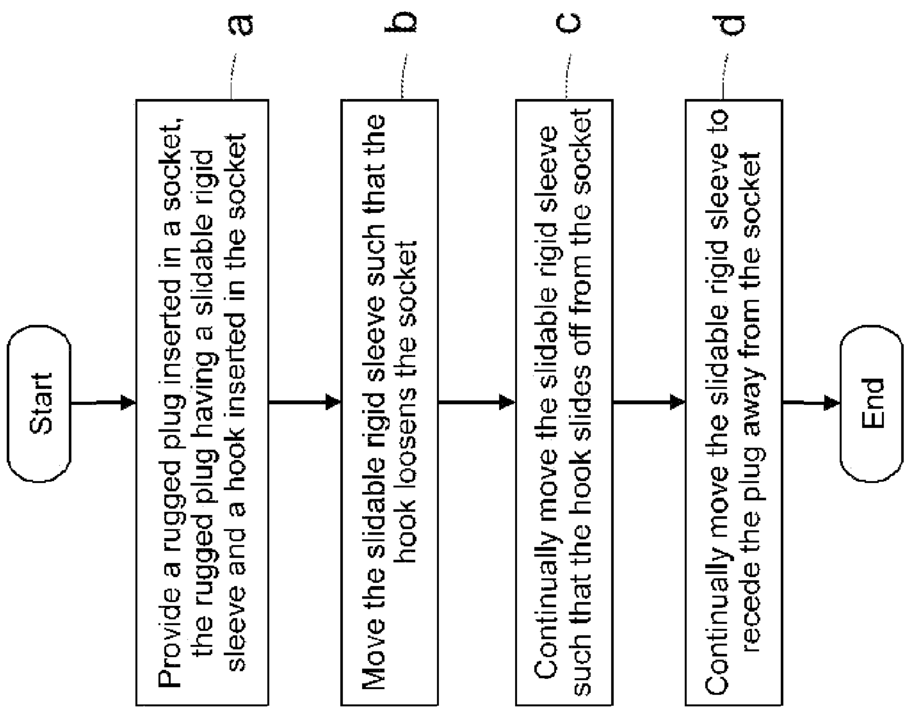
FIG. 8 is a flowchart of an unplugging method for a rugged plug according to an embodiment of the disclosure.

Referring to FIG. 1 and FIG. 8, an unplugging method applied to the above rugged plug 10 is further provided according to an embodiment of the disclosure. The unplugging method includes the following steps.

Figure 4:
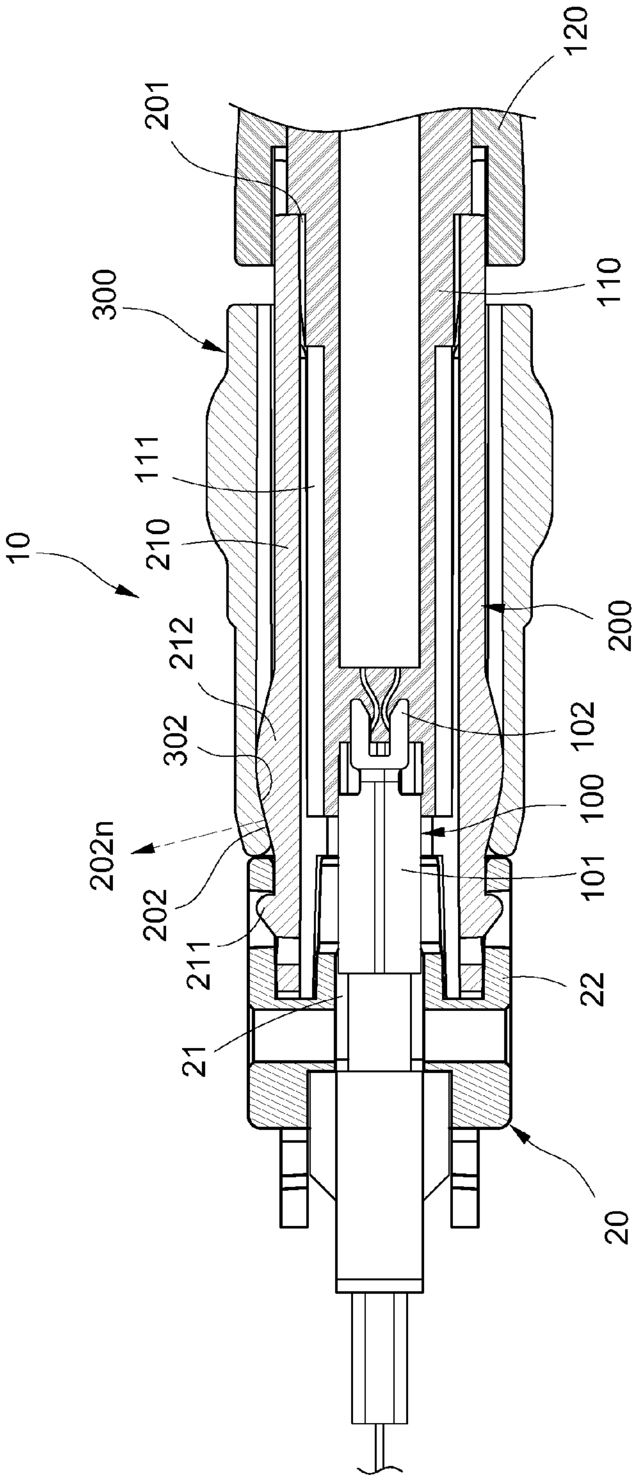
FIG. 4 a longitudinal section diagram of a rugged plug plugged in a socket according to an embodiment of the disclosure.

Referring FIG. 1, FIG. 4 and FIG. 8, in step a, a socket 20 and the rugged plug 10 are provided, wherein the rugged plug 10 is configured to plug in the socket 20. As described above, the rugged plug 10 has an elastic inner sheath 200 and a slidable rigid sheath 300. The slidable rigid sheath 300 movably sleeves the elastic inner sheath 200, and the elastic inner sheath 200 is made of, for example, 17-4PH stainless steel. The slidable rigid sheath 300 and the elastic inner sheath 200 are made of different stainless steel materials. In this embodiment, the slidable rigid sheath 300 is made of, for example, 316L stainless steel. The socket 20 includes a rigid housing 22, and the slidable rigid sheath 300 and the rigid housing 22 may be made of the same stainless steel material.

The elastic inner sheath 200 has an elastic arm 210, which is defined with a hook 211 protruded from one lateral side of the elastic arm 210. The hook protrudes 211 from the side of the elastic inner sheath 200, and a tip of the hook 211 is a curved surface. When the rugged plug 10 is plugged in the socket 20, the elastic inner sheath 200 is plugged in the rigid housing 22, and the hook 211 is inserted in the rigid housing 22 and is connected at the rigid housing 22 of the socket 20.

An actuating slope 202 is defined on the elastic arm 210, and a direction normal to the actuating slope 202 is biased toward the socket 20. The slidable rigid sheath 300 has an actuating structure 302, and the actuating structure 302 abuts against the actuating slope 202. The rugged plug 10 includes a connector 100 inserted in the elastic inner sheath 200, and the socket 20 includes a mating connector 21 inserted in the rigid housing 22. When the rugged plug 10 is plugged in the socket 20, the connector 100 is connected to the mating connector 21. If the connector 100 is in a USB type-C receptacle specification as shown in FIG. 1, the mating connector 21 is in a USB plug specification; if the connector 100 is in a USB type-C plug specification as shown in FIG. 7, the mating connector 21 is in a USB type-C receptacle specification.

Figure 5:
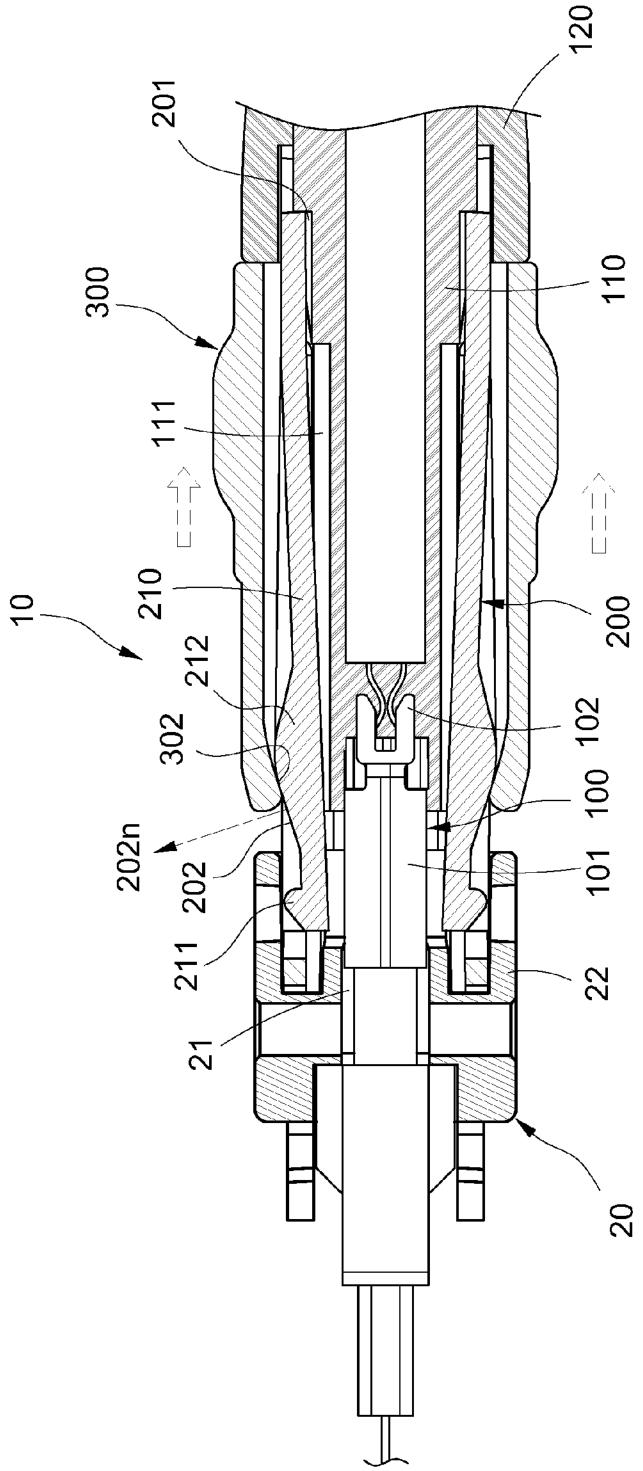
FIG. 5 and FIG. 6 are schematic diagrams of a rugged plug unplugged from a socket according to an embodiment of the disclosure.

Referring to FIG. 4, FIG. 5 and FIG. 8, in step b following step a, the slidable rigid sheath 300 is moved in a direction away from the socket 20 such that the actuating structure 302 pushes against the actuating slope 202. Because the slidable rigid sheath 300 has a rigidity higher than that of the elastic inner sheath 200 and the elastic inner sheath 200 is elastic at the slidable rigid sheath 300, the elastic arm 210 elastically deforms when pressed by the actuating structure 302 and is biased toward into the elastic inner sheath 200. The hook 211 recedes into the elastic inner sheath 200 and loosens the socket 20 when the elastic arm 210 is biased toward into the elastic inner sheath 200.

In step c following step a, the slidable rigid sheath 300 is continually moved in the direction away from the socket 20. At this point, the actuating structure 302 still presses against the actuating slope 202, and the slidable rigid sheath 300 at the same time presses the reinforcement sheath 120, and thus the rugged plug 10 in overall is pushed and moved along with the slidable rigid sheath 300. A tip of the hook 211 is a curved surface, and can thus easily slide off from the socket 20 when the rugged plug 10 moves.

Figure 6:
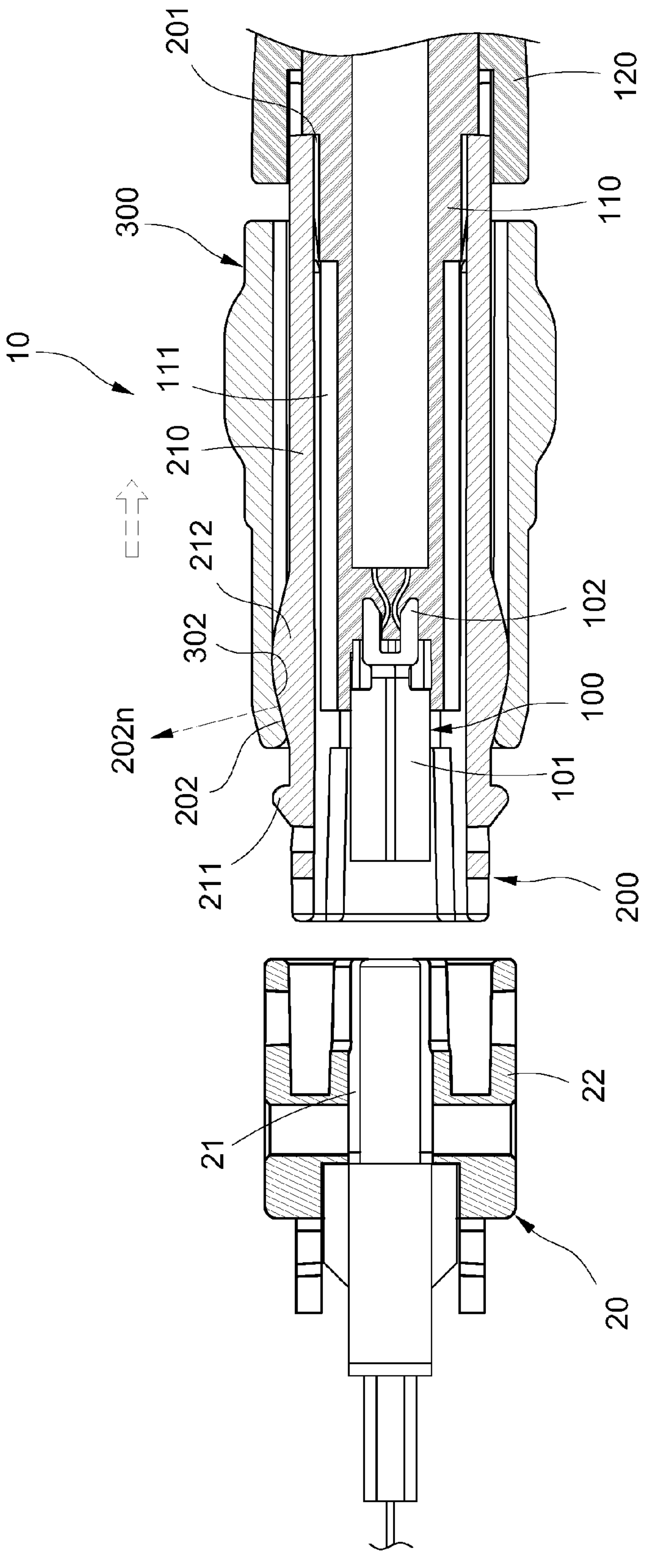

Referring to FIG. 6 and FIG. 8, in step d following step c, the slidable rigid sheath 300 is continually moved in the direction away from the socket 20, and the rugged plugged 10 becomes receded from the socket 20.

In conclusion, when a user unplugs the plug 10 from the socket 20 by operating the rugged plug 10 of the disclosure using the foregoing unplugging method, the user is able to simultaneously unlock the hook 211 and recede the rugged plug 10 by merely holding and pulling the slidable rigid sheath 300 in a direction away from the socket 20.

The description above provides merely preferred embodiments of the disclosure, and are not to be construed as limitations to the scope of the claims of the disclosure. All equivalent modifications practicing the spirit of the disclosure are to be encompassed within the scope of the disclosure.

What is claimed is:

1. A rugged plug, comprising:

a connector, having a coupling end and a wiring end opposite to the coupling end, wherein a wire extends from the wiring end of the connector;

an elastic inner sheath, sleeving the connector, the elastic inner sheath having:

an elastic arm having an actuating slope defined thereon, a direction normal to the actuating slope being biased toward the coupling end of the connector, the elastic arm being separated from the coupling end of the connector, a yielding recess corresponding to the elastic arm being provided on an outer wall of the wire, and the elastic arm being capable of being biased and receded in the yielding recess; and a hook, having a tip with a curved surface, protruding from an outer wall of the elastic inner sheath, the hook being configured to recede into the elastic inner sheath when the elastic arm receives a force and being biased toward the elastic inner sheath; and a slidable rigid sheath, movable relative to the elastic inner sheath, wherein the slidable rigid sheath has an actuating structure co-operable with the actuating slope to move the elastic arm and the hook to enable connection and disconnection of the connector relative to a mating connector.

2. The rugged plug according to claim 1, wherein the elastic inner sheath and the slidable rigid sheath are made of different stainless steel materials.

3. The rugged plug according to claim 1, wherein the connector is in a universal serial bus (USB) type-C plug specification or the connector is in a USB type-C receptacle specification.

4. The rugged plug according to claim 1, wherein one end of the elastic inner sheath has a port, and the port packs against the wire.

5. The rugged plug according to claim 4, wherein the wiring end of the connector is enveloped by a reinforcement sheath, and the wire passes through the reinforcement sheath and envelops the port of the elastic inner sheath.

6. The rugged plug according to claim 1, wherein the elastic arm extends from the wiring end of the connector toward the coupling end of the connector.

7. An unplugging method for a rugged plug, comprising:

a) providing a socket and a rugged plug plugged in the socket, wherein the rugged plug has an elastic inner sheath and a slidable rigid sheath, the slidable rigid sheath movably sleeves the elastic inner sheath, the elastic inner sheath has an elastic arm having an actuating slope defined thereon, a direction normal to the actuating slope being biased toward a coupling end of a connector to mate with the socket, the elastic arm being separated from the coupling end of the connector, a yielding recess corresponding to the elastic arm being provided on an outer wall of a wire extending from a wiring end of the connector opposite to the coupling end of the connector, and the elastic arm being capable of being biased and receded in the yielding recess; and, a hook, having a tip with a curved surface, protruding from an outer wall of the elastic inner sheath, the hook being configured to recede into the elastic inner sheath when the elastic arm receives a force and is biased into the elastic inner sheath;

b) moving the slidable rigid sheath in a direction away from the socket, such that an actuating structure pushes the actuating slope and biases the elastic arm, and the hook recedes toward into the elastic inner sheath and loosens the socket;

c) continually moving the slidable rigid sheath in the direction away from the socket to push and move the rugged plug, such that the tip of the hook slides off from the socket; and d) continually moving the slidable rigid sheath in the direction away from the socket to recede the rugged plug away from the socket.

8. The unplugging method for a rugged plug according to claim 7, wherein the socket comprises a rigid housing, and the hook is connected at the rigid housing.

9. The unplugging method for a rugged plug according to claim 8, wherein when the rugged plug is plugged in the socket, the elastic inner sheath is plugged in the rigid housing, and the hook is inserted in the rigid housing.

10. The unplugging method for a rugged plug according to claim 8, wherein the rigid housing and the slidable rigid sheath are made of a same stainless steel material.

11. The unplugging method for a rugged plug according to claim 8, wherein the rugged plug comprises the connector inserted in the elastic inner sheath, the socket comprises a mating connector inserted in the rigid housing, and when the rugged plug is plugged in the socket, the connector is connected to the mating connector.

12. The unplugging method for a rugged plug according to claim 11, wherein the connector is in a universal serial bus (USB) type-C plug specification, and the mating connector is in a USB type-C receptacle specification; or the connector is in a USB type-C receptacle specification, and the mating connector is in a USB type-C plug specification.

13. The unplugging method for a rugged plug according to claim 7, wherein the elastic inner sheath and the slidable rigid sheath are made of different stainless steel materials.

* * * * *